Figure 1:
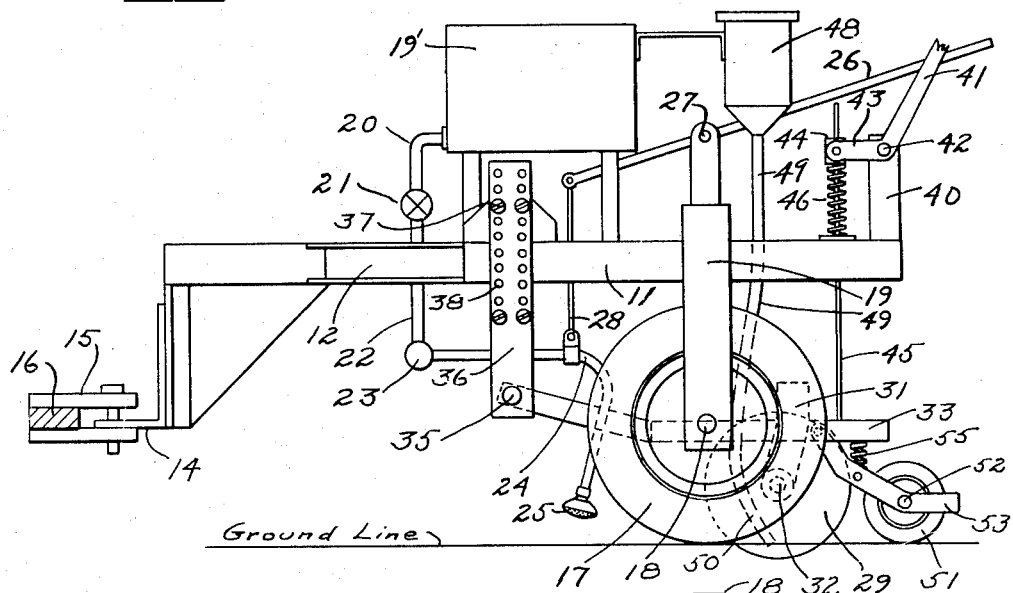

July 17, 1956   F. W. ROHNERT   2,754,622
APPARATUS FOR WEED KILLING AND SEED SOWING
Original Filed April 26, 1949

INVENTOR
FREDERICK WALDO ROHNERT.
BY
Lippincott & Smith
ATTORNEYS

United States Patent Office 2,754,622
Patented July 17, 1956

2,754,622

APPARATUS FOR WEED KILLING AND SEED SOWING

Frederick Waldo Rohnert, San Benito County, Calif.

Original application April 26, 1949, Serial No. 89,724. Divided and this application September 17, 1951, Serial No. 246,969

3 Claims. (Cl. 47—1)

This invention is directed to weed killing and seed sowing apparatus, as well as to a method by which an area to be planted may be freed of contamination of weeds, insects, larvae or the like and then promptly planted. The present application is a division of application Serial No. 89,724 filed by this applicant on April 26, 1949 (now abandoned).

It has been found to be a difficult problem for graziers and soil conservationists to cultivate beneficial grasses and plants on soils which have been overgrazed and in need of cover to prevent erosion and to increase the feed value of the range, both from an economic and efficiency standpoint.

The present invention is directed to apparatus of the type by which the seed to be sown may be deposited without going to the expense of eliminating any then present plant growth, such as by disking, plowing and the like. The invention is so constituted that the arrangement to be set forth and disclosed provides a ready means to overcome the detrimental effects of plant growths present at the time it is desired to commence the sowing operation and still provides for sowing the seed during the same traverse of the ground area. It is usually necessary, in order to conserve the soil moisture for the benefit of the beneficial plants to be sown, that the growths covering the land shall be destroyed prior to the time the seeds are actually able to germinate. Were this not the case the desired plants would not be able successfully to germinate and reach a mature state because the competition of the undesired plants with those desired is too great. The result is that by means of this invention greater efficiency of the seeding process is obtained.

The invention herein to be described also is such that it will provide apparatus by which the seeds to be sown are placed directly in substantially undisturbed soil and it is not necessary, therefore, to plow, disk, harrow or the like the complete area to be covered in order to eliminate competitive and moisture depleting original growths which otherwise would prevent proper germination of newly planted seeds. According to the invention the apparatus to be disclosed is of such a nature that the seeds to be planted are placed beneath the surface of the soil so as to be protected from birds, insects, small animals, wind, frost, and the like and insured the receipt of enough moisture to germinate properly. Normally there is usually not enough moisture in the soil otherwise to sustain and insure early growth of much of the seed that is planted. Likewise, many insects and larvae tend to prevent proper seed germination.

To this end, the apparatus herein to be set forth embodies essentially a process of substantially eliminating undesired plant, insect and larval life and then sowing the seeds and covering with earth before any contamination thereof can result. The procedure leads to great increases in the efficiency of planting and increases the economic yield from the area through improved quality of forage which can be had from areas where sowing seeds of more nutritious plants and grasses is made possible. The procedure also makes it possible for the forester and the soil conservationist to sow perennial plants and grasses which give soil protection and moisture storing capacity during all seasons of the year and not merely during the spring growth periods where annual species account for most of the growths.

Likewise, according to the present invention provision is made for eliminating the expense of soil preparation on many crops because it becomes unnecessary especially to treat the land areas where it is desirable to maintain a soil cover of some sort at all times either by way of growing crops or residues to prevent erosion by wind.

The arrangement is such that during the course of one operation it is possible to free the ground from any type of pest or plant or animal or insect life, as well as to reduce weather risks considerably, because the seeds are sown at the most opportune time. The time element heretofore required to plow, disk, harrow and drill the seeds under the usually practiced present methods is reduced to but a single operation. In this way there is no untimely relay in order to follow the sequence of steps which otherwise might result in many instances, because of wet weather when crops could not properly be sown following plowing, disking, harrowing and the like.

In its preferred form the invention comprises a mechanism adapted to be attached to traction or locomotive apparatus and moved thereby over the land area to be planted or sown. During the course of this traverse of the land area to be sown, provision is made for applying a substance, usually in the form of a liquid, to kill growing but unusable plants, insects, larvae and the like. This deposited substance will for convenience herein be termed an herbicide, whether it be used actually as an herbicide, an insecticide or a larvacide. Upon covering the ground area within desired regions by the herbicide, a furrow or groove in which the seed planting is to occur is cut in the traversed ground by any suitable form of device. There is positioned in close association with the furrowing or grooving device a seed planting tube or trough from which the seeds are ejected or permitted to fall to the ground in any way desired. Following the operation of planting the seeds in the formed furrows or grooves it is usually desirable to permit a packer-roller to cover the newly planted seeds with loose earth such, for instance, as may be scraped by the packer-roller from the lower edges of the cut furrows or grooves. The seeds so deposited at the lower edges of the cut furrows or grooves are placed beneath the portions of soil immediately after the ground is subjected to the influence of the herbicide. Therefore, the newly planted seeds are permitted to germinate before the herbicide can penetrate the earth to the depth of the seed planting so they fully germinate uncontaminated by the applied herbicide, in that the applied material evaporates or is otherwise prevented from becoming effective on the new planting.

With the foregoing in mind, it becomes the primary object of this invention to provide a new planting apparatus for accomplishing the foregoing results which will make possible the planting of greater areas at considerably reduced costs and insure at the same time a higher percentage of germination of the planted seeds.

Likewise it is an important objective of this invention to provides ways and means by which new growths can be planted without first eliminating any present growths upon the land to be so planted.

Figure 2:
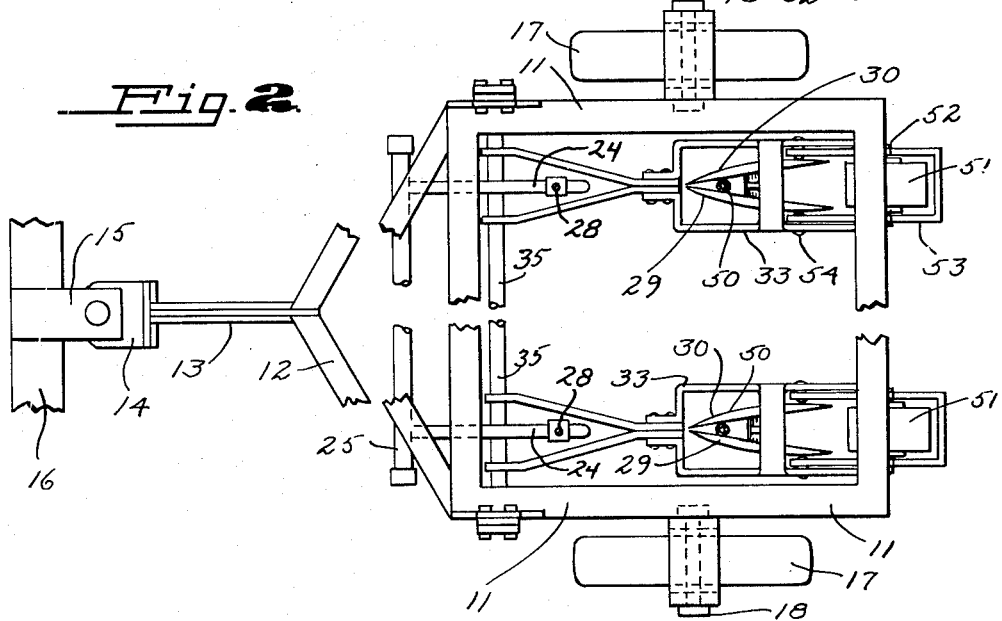

Other objects, of course, will suggest themselves when the following description of a preferred form of the apparatus is considered in connection with the accompanying drawings, of which Fig. 1 represents in schematic form an elevation of one form which the apapratus may assume, and Fig. 2 is a partial plan view of the apparatus of Fig. 1 looking down upon it with all of the supporting structure above the main framework of the device removed and other portions omitted for purposes of simplification.

In the apparatus set forth by the drawings there is provided a main framework 11 which is usually of reasonably rigid construction and may be formed of metal or of rather strong wood or composition material. In one preferred form of the invention the framework comprises generally light weight I-beam pieces which are riveted or bolted together to form the composite generally box-like framework designated. The forward end of the frame 11 is provided with a yoke 12 and a bar 13 having at one end thereof a coupling or the like 14 which is adapted to couple the coupler 15 by means of a pin or the like. The coupler 15 is normally attached to the rear end of tractive or locomotive apparatus (not shown, but of which the rear framework is illustratively designated by the cross member 16).

The main framework 11 is supported above the ground by means of the support wheels 17 carried upon an axle 18 which, in turn, is supported upon the upright 19 that is secured to the framework in any desired manner, such, for instance, as by riveting, bolting or the like (not shown). The support wheel 17 may be, and usually is, rubber tired to provide for ready rolling over the ground to be cultivated. The tires are of generally wide cross section so that the arrangement does not tend to penetrate deeply into the ground.

Above the main support frame there is a tank, conventionally represented at 19', which contains the herbicide material. This material is usually in the nature of volatile oils which tend to sterilize all plant life, insect life, larvae and the like which are touched thereby, but the material is such that it will evaporate in the course of a day or two. Generally the applied herbicide will not penetrate into the earth to a depth coinciding with that at which the new seed growths are to be planted although it is normally of sufficient strength to kill the plant life which would otherwise choke the growth of the new seeds as they germinate.

To release the herbicide to the earth there may be contained within the tank 19 or supported upon the framework 11, as desired, a pump or the like (not shown) to force the liquid from the tank through the pipe 20 and to the control valve 21, from whence it falls through the pipe 22 and to the adjustable connector 23 and thence from the outlet pipe 24 to the nozzle 25. In other instances, a gravity feed is adequate.

The nozzle, conventionally represented, is usually in the nature of a support head serving to spray out the emergent liquid over areas of ground which are determined generally by the pressure at which the herbicide is ejected from the tank 19 and by the elevation of the nozzle 25 above the ground so as to permit more or less of the ground area to be covered. Adjustment of the nozzle or spray head 25 in a vertical direction is accomplished by a movement of the lever arm 26 which is pivoted at 27 and attaches to a link 28 which, in turn, clamps around the tube 24. Provision is made for holding the lever arm in any of a number of positions such as by stops, notches or the like (not shown).

In this way, as the machine is drawn forward on the wheels or rollers 17 it can be seen that spraying of all traversed ground occurs by virtue of the herbicide material being ejected from the nozzle 25.

Practically concurrently with the spraying, the ground so sprayed is parted, grooved, or furrowed by means of the disk elements conventionally represented at 29 and 30 which are carried within the framework 11. The disks are preferably supported by a support arm 31 (see Fig. 1 particularly) carrying the disk supporting axles 32. The arm 31 is in turn supported upon a frame 33 which is pivoted at 35 to the support arm or bracket 36. To regulate the depth to which the disk elements 29 and 30 can be moved beneath the surface of the earth to cut the grooves or furrows into which the new seeds are to be planted, the bracket 36 is adjustable up and down on the framework 11 by means of the position at which bolts 37 are fastened in the indicated holes 38. Likewise to give a further degree of control and to more or less spring mount the disk, a bracket 40 at the rear end of the apparatus supports a generally bell-crank type of lever arm 41 carried upon a pivot axle 42. The outer end 43 of the bell-crank lever supports a collar 44 through which a rod 45 passes. The rod 45 has its lower end attached to the disk support framework 33 and its upper end secured by a set screw or the like (not shown) to the collar 44. A tensioning spring 46 then controls the downward pressure on the disk elements 29 and 30 in accordance with the position of the bell-crank lever arm 41 to control the groove depth, as desired.

Practically concurrently with the formation of the grooves or furrows it becomes desirable to apply seed from which the new growth shall germinate. To this end a hopper 48 is carried upon the framework 11 or supported from the tank 19 and from this hopper the new seeds are forced or fall by gravity, as desired, through the pipe or tube or duct 49 from which they emerge at point 50 to fall directly and immediately into the cut furrows or grooves.

A packing roller 51 is supported upon an axle 52 mounted in a framework or yoke 53 that is pivotally attached at 54 to the disk supporting framework 33. The packing roller is spring pressed downwardly by means of a spring 55, conventionally represented as positioned between the support yoke 53 and the rear of the framework 33. The tension of this spring is regulated, as desired, to control the downward pressure exerted upon the packing roller. The packing roller is generally rubber tired and of a width such that it falls into the furrow or groove cut by the disk elements 29 and 30 and tends to scrape or move some of the dirt from the lower portions of the cut or groove and thereby promptly cover the newly planted seeds upon their deposition in the earth.

While the arrangement of Fig. 2 shows only two of the several parts of disk elements, packing rollers, seed deposition ducts and the like and the spray nozzles for the herbicide application, it will be understood that this showing is merely illustrative and that in normal operations the support frame includes a multiplicity of such elements and these generally fill substantially the complete framework. The operation and control of the spraying, the disking, the furrowing, the deposition of the seeds and the packing roller pressure is normally controlled by an operator who is seated at the rear of the framework 11 on a seat which is not shown for simplicity of illustration. The control of the operation of the lever 26 to control the elevation of a spray nozzle 25 and the positioning of the bell-crank lever 41 to control the depth at which the groove or furrow is cut are each placed under control of such an operator.

The arrangement herein shown has been presented in extremely simplified form in order to disclose the principles of operation. It is to be understood, however, that in practice several seed hoppers may be used; likewise the tank from which the herbicide is forced may be carried upon the tractive apparatus itself and supplied to the outlet pipe 24 and nozzle or spray head 25 by way of a flexible tube (not shown) without changing in any way the broad principle of the operation. Also, it is to be understood that in some instances instead of ejecting from individual spray heads or nozzles the volatile spray or oil or the like used to kill the growths or insects may be distributed from outlets in an elongated tubular member which is supplied with the herbicide from the tank in a manner generally like that used to supply the nozzle of spray head 25.

In some instances instead of supporting the nozzle or sprayhead 25 in the manner shown and making its position or elevation relative to earth controllable through the movement of the lever arm 26, it occasionally becomes feasible to support this nozzle or sprayhead directly from the frame 33. Since the frame 33 is pivotally supported on the rod 35, it is, of course, apparent under such circumstances that the sprayhead or nozzle would be moved up or down along with the frame 33. A connection of this type may be established by providing a flexible connection between the adjustable connector 23 and the point of attachment on the frame 33. The portion of the connection between the frame 33 and the sprayhead or nozzle 25 may be rigid, if desired. This, then, provides an automatic adjustment of the nozzle or sprayhead with motion of frame 33.

Having now described the invention, what is claimed is:

1. Seed sower apparatus for use in combination with locomotive apparatus for drawing it over the ground along a desired planting path, comprising a supporting frame, support wheels on said frame for rolling it over the ground to be planted, a tank mounted on the forward portion of said frame for holding an herbicidal liquid, a spray nozzle connected to said tank and positioned to spray said liquid upon the ground over which said apparatus is drawn, means mounted on said frame behind said spray nozzle for forming a furrow in the sprayed ground exposing thereby soil uncontaminated by said liquid at the apex and sides of such furrow, a seed hopper carried by said frame, and a duct connected to said hopper and extending beneath said frame and positioned to direct seeds from said hopper onto the uncontaminated soil at the apex of said furrow.

2. Seed sower apparatus for use in combination with locomotive apparatus for drawing it over the ground along a desired planting path comprising a supporting frame support wheels on said frame for rolling it over the ground to be planted, a tank mounted on the forward portion of said frame for holding an herbicidal liquid, a spray nozzle connected to said tank and positioned to spray said liquid upon the ground over which said apparatus is drawn, means mounted on said frame behind said spray nozzle for forming a furrow in the sprayed ground exposing thereby soil uncontaminated by said liquid at the apex and sides of such furrow, a seed hopper carried by said frame, a duct connected to said hopper and extending beneath said frame and positioned to direct seeds from said hopper onto the uncontaminated soil at the apex of said furrow, and means mounted on said frame behind said duct for covering seeds deposited thereby with uncontaminated soil from the sides of said furrow.

3. Seed sower apparatus for use in combination with locomotive apparatus for drawing it over the ground along a desired planting path comprising a supporting frame, support wheels on said frame for rolling it over the ground to be planted, a tank mounted on the forward portion of said frame for holding an herbicidal liquid, a spray nozzle connected to said tank and positioned to spray said liquid upon the ground over which said apparatus is drawn, a pair of furrow-forming discs mounted on said frame behind said nozzle adapted to form in the sprayed ground a furrow exposing at the apex and sides thereof soil uncontaminated by said liquid, a seed hopper mounted on said frame, and a duct leading from said hopper and terminating between said discs for depositing seed in the uncontaminated soil of the freshly-formed furrow.

References Cited in the file of this patent

UNITED STATES PATENTS

| 38,528 | Allen | May 12, 1863 |
| 112,169 | Nicholes | Feb. 28, 1871 |
| 205,971 | Mast | July 16, 1878 |
| 304,074 | Carr | Aug. 26, 1884 |
| 331,687 | Crane | Dec. 1, 1885 |
| 376,089 | Harter | Jan. 10, 1888 |
| 393,390 | Patric | Nov. 27, 1888 |
| 509,856 | Allen | Dec. 5, 1893 |
| 987,482 | Myers | Mar. 21, 1911 |
| 1,094,422 | Bottom | Apr. 28, 1914 |
| 1,474,599 | Martin | Nov. 20, 1923 |
| 1,823,244 | White | Sept. 15, 1931 |
| 2,435,204 | Davidson | Feb. 3, 1948 |
| 2,448,265 | Kagy | Aug. 31, 1948 |

FOREIGN PATENTS

| 262,525 | Germany | July 14, 1913 |

OTHER REFERENCES

Chemical Abstracts, vol. 42, pub. 1948, col. 9041–A, article 'Effects of Soil Applications . . ."